(12) United States Patent
Angerfors

(10) Patent No.: US 6,269,914 B1
(45) Date of Patent: Aug. 7, 2001

(54) DISC BRAKE DEVICE FOR VEHICLES

(75) Inventor: Dan Angerfors, Floda (SE)

(73) Assignee: AB Volvo (SE)

( * ) Notice: Subject to any disclaimer, the term of this patent is extended or adjusted under 35 U.S.C. 154(b) by 0 days.

(21) Appl. No.: 08/973,920

(22) PCT Filed: Jun. 20, 1996

(86) PCT No.: PCT/SE96/00823

§ 371 Date: Mar. 31, 1998

§ 102(e) Date: Mar. 31, 1998

(87) PCT Pub. No.: WO97/01044

PCT Pub. Date: Jan. 9, 1997

(30) Foreign Application Priority Data

Jun. 20, 1995 (GB) .................................................. 9512522
Dec. 19, 1995 (SE) .................................................. 9504528

(51) Int. Cl.⁷ .................................................. F16D 65/40
(52) U.S. Cl. ...................................... 188/71.9; 188/196 D
(58) Field of Search ................................ 188/71.9, 72.7, 188/72.9, 196 D, 71.8

(56) References Cited

U.S. PATENT DOCUMENTS 5,379,867 * 1/1995 Macke et al. ........................ 188/71.9
5,520,267 * 5/1996 Giering et al. ....................... 188/72.7
5,568,845 * 10/1996 Baumgartner et al. ............. 188/71.9
5,833,035 * 11/1998 Severinsson ........................ 188/71.9

FOREIGN PATENT DOCUMENTS 0 566 009 A1   10/1993   (EP) .
2 426 182      12/1979   (FR) .
93/21454       10/1993   (WO) .
93/22579       11/1993   (WO) .
93/24762       12/1993   (WO) .
94/21936        9/1994   (WO) .

* cited by examiner

Primary Examiner—Matthew C. Graham
(74) Attorney, Agent, or Firm—Lerner, David, Littenberg, Krumholz & Mentlik, LLP

(57) ABSTRACT

Arrangement for disc brakes used on motor vehicles, comprising a tappet assembly (14), movable inside the caliper (1) and which, through an axial movement along its longitudinal axis relative to the caliper, can be changed from an active position and a passive position. A regulating device can, through a rotating movement of a tappet extension which is part of the tappet, move an end part of the tappet in an adjustment movement to compensate for changes in the tappet stroke. The tappet comprises a first tappet assembly (16) which is movable axially in the caliper (1) along its longitudinal axis (18) for braking movements, and which is rotatable along its longitudinal axis for adjustment movements. The end part (29) of the tappet (14) is carried by a tappet extension (25) which is non-rotatable relative to the caliper and which is connected to the first tappet assembly, through which rotating movement it performs an axial movement relative to the first tappet assembly.

40 Claims, 2 Drawing Sheets

US 6,269,914 B1

DISC BRAKE DEVICE FOR VEHICLES

TECHNICAL FIELD

The present invention relates to an arrangement for disc brakes used on motor vehicles.

BACKGROUND OF THE INVENTION

One problem associated with one commonly used brake system for e.g. heavier vehicles is that the actuating means, which alter the brake pad units between braking and released positions, have end sections which, during certain conditions e.g. during adjustment for the gradual wear of the brake pad units, are affected by torsional forces, which can result in damage to e.g. covering boots and the like with the accompanying deterioration of their function as dirt protection sealing means.

SUMMARY OF THE INVENTION

The object of the present invention is to provide an arrangement with which it is ensured that the sealing means of the actuating means can maintain their protective function during a longer time and to therewith reduce the need for service and the risk of brake failure.

Said object is achieved by the arrangement according to the present invention, comprising a first tappet section and an extendible tappet section, the extendible tappet section being extendible in relation to the first tappet section for movement into an active position, and a member connected to the first tappet section and being engaged with the extendible tappet section so that the extendible tappet section is non-rotatably held. Preferably, the first tappet section is rotatable and has a first axial bore therethrough. The extendible tappet section may be telescopingly received within the first axial bore so that rotation of the first tappet section axially extends the extendible tappet section. The first tappet section may be threadably engaged with the extendible tappet section.

The extendible tappet section preferably has a groove extending therethrough for receiving the member, the bore and the member having cross-sectional shapes which interact so that the extendible tappet section is non-rotatable.

Preferably, the first tappet section includes a plate to which the member is secured, the member being adapted to convey a force to the tappet assembly for effecting movement into the active position. The first tappet section may also include a portion for preventing further extension of the extendible tappet section. The first tappet section and the extendible tappet section may be threadably engaged and the portion on the first tappet section may comprise an unthreaded surface on the first tappet section.

Preferably a seal is provided between the first tappet section and the extendible tappet section.

Another aspect of the invention is a tappet assembly for a disc brake device for motor vehicles, comprising a first tappet section and an extendible tappet section, the extendible tappet section being extendible in relation to the first tappet section for movement into an active position, and rotation-locking means for maintaining the tappet extension in a non-rotatable position, the rotation-locking means being connected to the first tappet section. This aspect of the invention may include the additional features discussed above.

In another aspect of the present invention, a disc brake device for motor vehicles comprises at least one brake pad unit, at least one tappet assembly movable within a caliper for moving each of the at least one brake pad units to an active position, the at least one tappet assembly including the features discussed above.

BRIEF DESCRIPTION OF THE DRAWINGS

The invention will be described in greater detail in the following with reference to the accompanying drawings, in which.

PREFERRED EMBODIMENT

Figure 1:
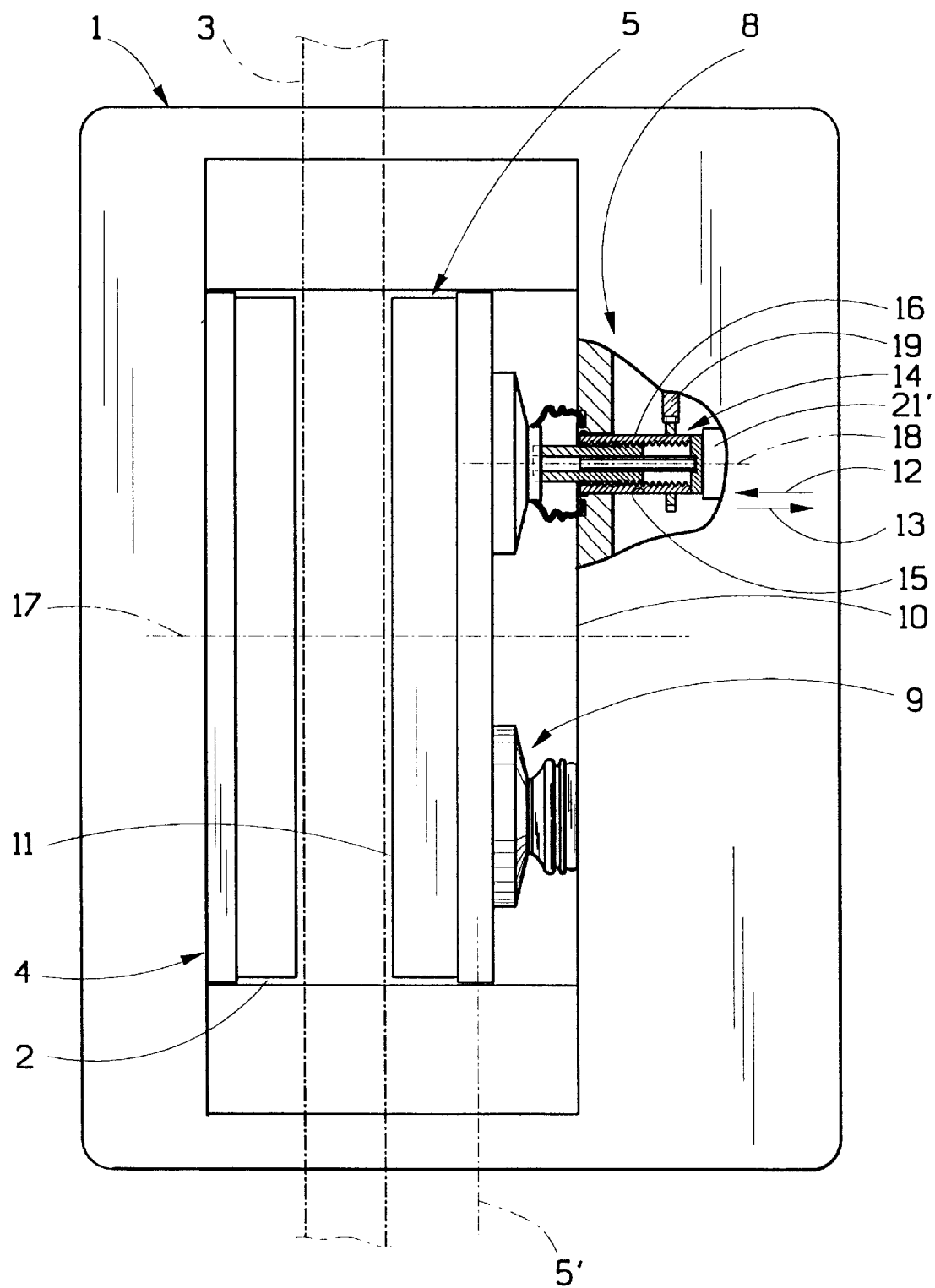
FIG. 1 is a partially sectioned elevational view of a brake caliper equipped with an arrangement according to the present invention.

FIG. 1 shows a caliper 1 of the so-called floating type, which thus exerts a highly symmetrical force upon the portion of the brake disc 3 which projects into a recess 2 indicated with phantom lines. The brake disc is mounted in a conventional manner on a wheel hub for rotation together with the wheel of a motor vehicle, e.g. a heavier vehicle such as a truck. This symmetrical force is the effect of the caliper being slidable parallel to the rotational axle of the brake disc 3, in a conventional manner which is not shown. A brake pad unit 4, 5 is arranged on each side of the two sides 6, 7 of the brake disc, whilst actuating means, more specifically two units 8, 9, are arranged on only one side, in the shown example, for direct action against the outside surface 10 of one of the brake pad units. A brake lining 5 is arranged in a conventional manner on one side of the brake pad unit, having a friction surface 11 which is intended to be pressed against the sides of the brake disc by the actuating means 8, 9 in a braking/active position, but to return to a position in which the brake lining 11 is located at a short distance from the brake disc in a released/passive position. The caliper does not necessarily have to be of the floating type. If not, two actuating means are also arranged on the opposite side of the caliper on the outside surface of the brake pad unit 4. In the shown example, the two brake pad units 4, 5 are made as steel plates having brake linings on one side, but can also be made from friction material as one homogeneous unit.

Figure 2:
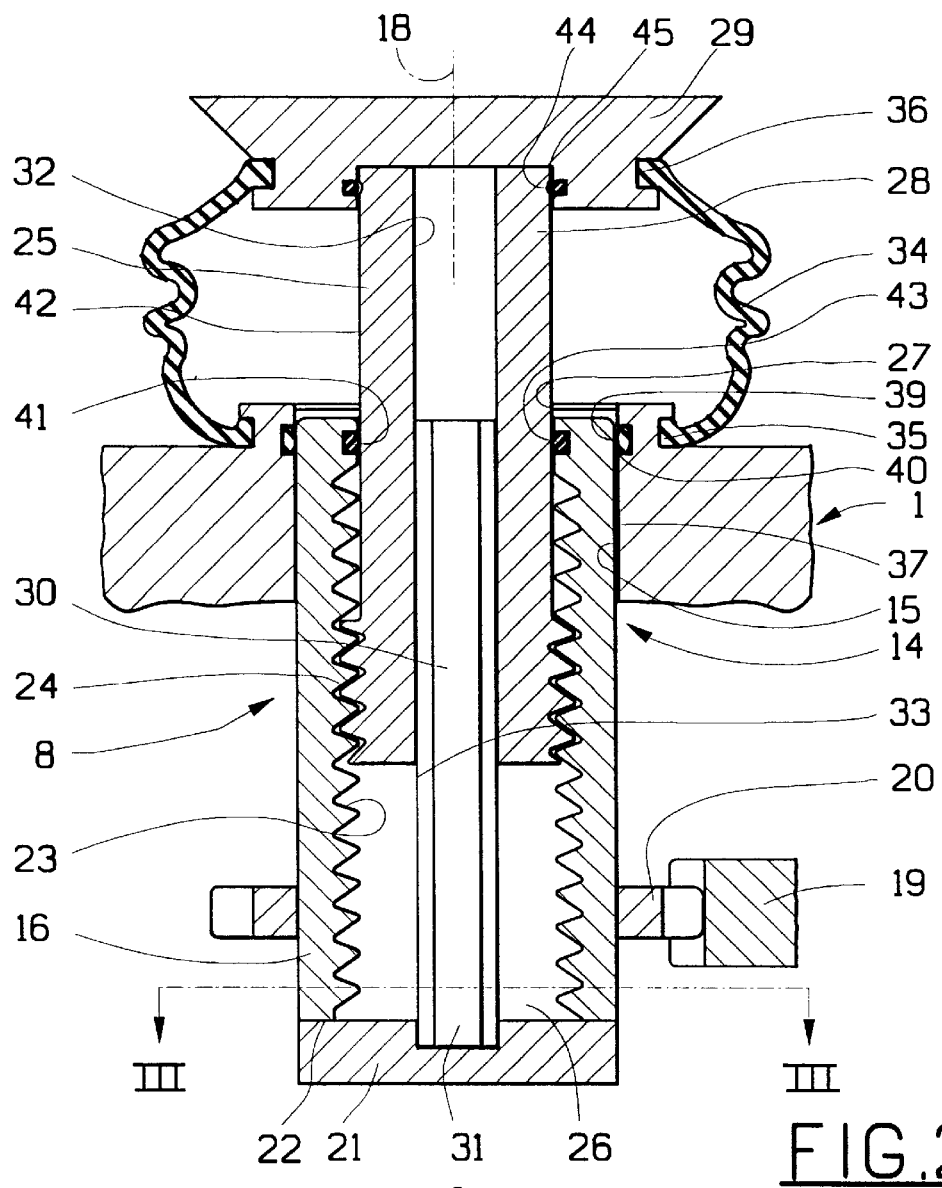
FIG. 2 is a central cross-section of an adjustable actuating means according to the invention, whilst
Figure 3:
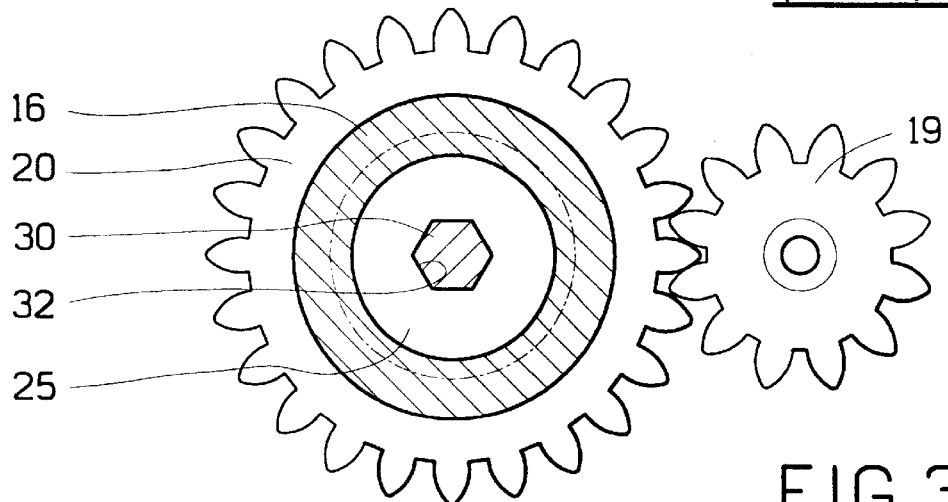
FIG. 3 shows a cross-section through the actuating means according to the invention along the line III—III in FIG. 2.

The actuating means 8, 9 are mechanical, where their linear reciprocal braking movement between braking position and passive position in the direction of arrows 12 and 13 respectively is achieved by means of the displacement of a tappet assembly 14 having a first tappet section 16 which is movable within a bore 15 in the caliper. The tappet section 16 inside the bore is situated with its longitudinal axis transversely and substantially perpendicular to the main plane 5' of the brake pad units and, thus, substantially parallel to the rotational axis 17 of the brake disc 3. The brake movement of the tappet assemblies 14 can be achieved in an already known manner using e.g. a pneumatic braking system which is commonly employed for heavier vehicles. The two actuating means 8, 9 have an adjustment arrangement whose purpose is to gradually adjust the position of the actuators as the pads and the disc wear down and can also be effectuated in a known manner. The adjustment arrangement comprises, inter alia, a separate, not shown rotating means which can be of an already known construction, and arranged to measure the stroke of the tappet assembly 14 and, further, to activate an adjustment mechanism, incorporated in the actuating means 8, to counteract the tendency towards increased travel caused by the described wear. For this purpose, the rotating means is provided with a pinion wheel 19, which meshes with a gear wheel 20, solidly fixed on the envelope surface of the tappet section 16, to produce a rotational movement of the tappet section 16 about its longitudinal axis 18. The braking movement of the tappet assembly 14, i.e. the switch between released position and braking position for the brake disc, is achieved by applying a pressure to the pressure plate 21 in a known manner by means of a pressure means 21' (see FIG. 1), which pressure is transmitted axially to the tappet section 16 via its annular end surface 22. The pressure plate 21 is, accordingly, movable in the axial direction of the actuator means 8, but is rotationally fixed, i.e. is non-rotatable, using any not shown guide means. The tappet section 16 has the shape of a sleeve, having an internal thread 23 meshing with an external thread 24 of a second part of the tappet which constitutes an extension 25 of the tappet assembly 14. The threaded parts form a motion transmitting means, which will be further described below. The extension 25 is axially movable in the direction of the axis 18 in a substantially cylindrical space 26, formed in the tappet section 16, which in its rear portion is sealed by the pressure plate 21 and in its forward portion has a substantially circular opening 27 through which the extension 25 protrudes with a forward end 28. This end supports a pressure head 29, which is arranged to apply the axial pressure on to the outer surface of the brake pad units 10 and, in so doing, move this to a brake position against the brake disc 3. The extension 25 is, similar to the pressure plate 21, rotationally fixed, which in the shown example is achieved by letting the pressure plate 21 support a rod 30 which is rotationally fixed in the pressure plate by being rigidly mounted at its one end 31 in the pressure plate. The extension 25 has a central groove 32 with an open end 33 in the rear facing direction, through which the rod 30 extends into the groove 32. A non-rotatable connection between the extension 25 and the rod 30 is ensured because the rod has a cross section which is non-circular and the groove 32 has a corresponding cross section, so that the rod 30 is allowed to move axially in the groove 32, but is prevented from mutual relative rotational movement. As is apparent from FIG. 2, the rod and the groove have a hexagonal cross section, but they can have another irregular profile, for example equipped with splines.

Between the pressure head 29 and the caliper 1 there is a dirt protector in the form of an elastic boots 34 which is attached to an annular groove 35 in the caliper and to an annular groove 36 in the pressure head respectively, to provide a solid attachment and a labyrinth seal. Between the cylindrical envelop surface 37 of the first tappet section 16 and the cylindrical bore 15 in the caliper, there is a sealing member in the form of an elastic sealing ring 39, e.g. an o-ring in an annular groove 40 in the cylinder bore. Between the internal thread 23 and the opening 27 of the space 26 there is an elastic sealing member in the form of an elastic sealing ring 41, which creates a seal between the tappet assembly 14 and its extension and which seals against a suitably cylindrically shaped part 42. The sealing ring 41 is, according to the shown example, arranged in an angular groove 43 in the tappet assembly 14 close to the opening 27. The external thread 24 has an extension in the axial direction which is limited to a portion of the total length of the extension 25. Its length and placement are chosen so that, more exactly, the external thread 24 does not come in contact with the sealing ring 41, but instead so that the area around the groove 43 forms a stop for the extension 25 in its outer position. In this way it is possible to shape the area 42, which cooperates with the sealing ring 41, for maximum sealing interaction with the sealing ring 41. In the event that the boot 34 should collapse, the two sealing rings 39, 41 will protect the inside of the brake system from dirt ingress. The pressure head 29 can, in principle, be non-rotatably fixed on the forward end 28 of the extension 25, but is advantageously somewhat loosely connected to the extension, e.g. via a locking ring 44 in a groove 45 in the pressure head. The functioning of the actuator means 8, 9 and the associated adjustment arrangement is thus the following. Activation of the brakes is achieved by a common axial movement of all the parts of the tappet assembly 14 belonging to the actuators relative to the caliper 1 and the brake disc 3, that is the pressure plate 21, the tappet section 16, the extension 25 and the pressure head 29. The extension 25 follows the tappet assembly's 14 movement completely due to their threads meshing, in combination with the non-rotatability of the extension relative to the caliper. The gear wheel 20 also follows the axial movement and is allowed to glide relative to the pinion wheel 19, which is wider than the gear wheel and is sufficiently wide to maintain meshing between the pinion wheel 19 and the gear wheel 20 during the total stroke of tappet section 16. In a known manner, no active pull back force applied to the actuating means 8, 9 is required, but the switch to non-braking position is effected by the cessation of pressure on the pressure plate 21 in combination with the retraction of the brake pad units 4, 5 through the rotational movement of the brake disc 3 and irregularities on the brake surface. The not shown rotating means measures the axial position 18 of the actuating means 8, 9, alternatively the movement of the not shown braking mechanism which operates against the pressure plate 21, whereby when reaching a certain amount of axial displacement of the piston member 16 in the direction of the brake disc 3, the rotating means is activated to make the pinion wheel 19 turn a revolution or a part of a revolution. This rotational movement is transmitted via the gear wheel 20 to an opposite rotational movement of the tappet section 16 which is maintained in its axial position by the counter force which is applied at all time to the pressure plate 21, whereby the tappet section 16 during the adjustment movement itself, i.e. its rotational movement, is kept axially fixed. Since the pressure plate 21 is non-rotatably fixed in the caliper 1 there is a certain sliding movement permitted between the pressure plate and the end surface 22 of the tappet section 16. Owing to the fact that the extension 25 is locked with respect to rotational movement via the rod 30 and furthermore is meshed with the tappet assembly 14, an axial displacement of the extension and the pressure head 29 takes place in the direction of the longitudinal axis 18. The direction of the rotational movement of the tappet section 16 and the direction of the threads of the cooperating threaded parts 23, 24 are so chosen that the rotational movement results in a forward movement of the extension 25 and the pressure head 29 towards the pad unit 5. In this manner, a regulation movement in the form of a screw movement takes place, which movement is transmitted to the pressure head 29 or the part which supports the pressure head, that is, the extension 25, in the form of an axial movement, whereby the boot 34 is not subjected to twisting forces, but only its own natural compression and expansion movement. Due to the regulation movement, it is ensured that a certain maximum stroke is not exceeded on account of wear of the pad units' 4, 5 friction layer or wear of the brake disc 3, whereby an unchanged swiftness is maintained for the brake mechanism during its entire service life. The invention is not limited to the description above nor to the examples shown on the drawings, but may be varied within the scope of the appended claims. For example, the blocking of the rotational movement of the extension 25 can be made in a different way, e.g. in the shape of one or more angled or spiral grooves in one tappet member, which grooves cooperate with projections on the other tappet member. The rotating means and the arrangement for activation of the brake can comprise conventional parts, for which reason they are not described further.

What is claimed is:

1. A tappet assembly for a disc brake device for motor vehicles, comprising:
   a first tappet section and an extendible tappet section, said extendible tappet section being extendible in relation to the first tappet section for movement into an active position;
   a pressure head supported by the extendible tappet section;
   a sealing means attached to the pressure head; and
   a member connected to said first tappet section and being engaged with said extendible tappet section so that said extendible tappet section is non-rotatably held.

2. The tappet assembly of claim 1, wherein said first tappet section is rotatable and has a first axial bore therethrough.

3. The tappet assembly of claim 2, wherein said extendible tappet section is telescopingly received within said first axial bore so that rotation of said first tappet section axially extends said extendible tappet section.

4. The tappet assembly of claim 3, wherein said first tappet section is threadably engaged with said extendible tappet section.

5. The tappet assembly of claim 1, wherein said extendible tappet section has a groove extending therethrough for receiving said member, said bore and said member having cross-sectional shapes which interact so that said extendible tappet section is non-rotatable.

6. The tappet assembly of claim 5, wherein said first tappet section includes a plate to which said member is secured, said member being adapted to convey a force to said tappet assembly for effecting movement into said active position.

7. The tappet assembly of claim 1, wherein said first tappet section includes a portion for preventing further extension of said extendible tappet section.

8. The tappet assembly of claim 7, wherein said first tappet section and said extendible tappet section are threadably engaged and said portion on said first tappet section comprises an unthreaded surface on said first tappet section.

9. The tappet assembly of claim 1, further comprising a seal between said first tappet section and said extendible tappet section.

10. A tappet assembly for a disc brake device for motor vehicles, comprising:
    a first tappet section and an extendible tappet section, said extendible tappet section being extendible in relation to the first tappet section for movement into an active position;
    a pressure head supported by the extendible tappet section;
    a sealing means attached to the pressure head; and
    rotation-locking means for maintaining said tappet extension in a non-rotatable position, said rotation-locking means being connected to said first tappet section and engaged with said extendible tappet section so that said extendible tappet section is non-rotatably held.

11. The tappet assembly of claim 10, wherein said first tappet section is rotatable and has a first axial bore therethrough.

12. The tappet assembly of claim 11, wherein said extendible tappet section is telescopingly received within said first axial bore so that rotation of said first tappet section axially extends said tappet extension.

13. The tappet assembly of claim 12, wherein said first tappet section is threadably engaged with said extendible tappet section.

14. The tappet assembly of claim 10, wherein said extendible tappet section has a groove extending therethrough for receiving said member, said bore and said member having cross-sectional shapes which interact so that said extendible tappet section is non-rotatable.

15. The tappet assembly of claim 14, wherein said first tappet section includes a plate to which said member is secured, said member being adapted to convey a force to said tappet assembly for effecting movement into said active position.

16. The tappet assembly of claim 10, wherein said first tappet section includes a portion for preventing further extension of said extendible tappet section.

17. The tappet assembly of claim 16, wherein said first tappet section and said extendible tappet section are threadably engaged and said portion on said first tappet section comprises an unthreaded surface on said first tappet section.

18. The tappet assembly of claim 10, further comprising a seal between said first tappet section and said extendible tappet section.

19. A disc brake device for motor vehicles, comprising:
    at least one brake pad unit;
    at least one tappet assembly moveable within a caliper for moving each of said at least one brake pad unit to an active position;
    said at least one tappet assembly including a first tappet section and an extendible tappet section, said extendible tappet section being extendible in relation to the first tappet section for movement into an active position, a pressure head supported by the extendible tappet section a sealing means attached to the pressure head, and rotation-locking means for maintaining said tappet extension in a non-rotatable position, said rotation-locking means being connected to said first tappet section and engaged with said extendible tappet section so that said extendible tappet section is non-rotatably held.

20. The device of claim 19, wherein said first tappet section is rotatable and has a first axial bore therethrough.

21. The device of claim 20, wherein said extendible tappet section is telescopingly received within said first axial bore so that rotation of said first tappet section axially extends said tappet extension.

22. The device of claim 21, wherein said first tappet section is threadably engaged with said extendible tappet section.

23. The device of claim 19, wherein said extendible tappet section has a groove extending therethrough for receiving said member, said bore and said member having cross-sectional shapes which interact so that said extendible tappet section is non-rotatable.

24. The device of claim 23, wherein said first tappet section includes a plate to which said member is secured, said member being adapted to convey a force to said tappet assembly for effecting movement into said active position.

25. The device of claim 24, wherein said plate is non-rotatably secured to said caliper.

26. The device of claim 19, further comprising a seal between said caliper and said first tappet section.

27. The device of claim 19, wherein said first tappet section includes a portion for preventing further extension of said extendible tappet section.

28. The device of claim 27, wherein said first tappet section and said extendible tappet section are threadably engaged and said portion on said first tappet section comprises an unthreaded surface on said first tappet section.

29. The device of claim 19, further comprising a seal between said first tappet section and said extendible tappet section.

30. A disc brake device for motor vehicles, comprising:

at least one brake pad unit;

at least one tappet assembly moveable within a caliper for moving each of said at least one brake pad units to an active position;

said at least one tappet assembly including a first tappet section and an extendible tappet section, said extendible tappet section being extendible in relation to the first tappet section for movement into an active position;

a pressure head supported by the extendible tappet section;

a sealing means attached to the pressure head; and a member connected to said first tappet section and being engaged with said extendible tappet section so that said extendible tappet section is non-rotatably held.

31. The device of claim 30, wherein said first tappet section is rotatable and has a first axial bore therethrough.

32. The device of claim 31, wherein said extendible tappet section is telescopingly received within said first axial bore so that rotation of said first tappet section axially extends said tappet extension.

33. The device of claim 32, wherein said first tappet section is threadably engaged with said extendible tappet section.

34. The device of claim 30, wherein said extendible tappet section has a groove extending therethrough for receiving said member, said bore and said member having cross-sectional shapes which interact so that said extendible tappet section is non-rotatable.

35. The device of claim 34, wherein said first tappet section includes a plate to which said member is secured, said member being adapted to convey a force to said tappet assembly for effecting movement into said active position.

36. The device of claim 35, wherein said plate is non-rotatably secured to said caliper.

37. The device of claim 30, further comprising a seal between said caliper and said first tappet section.

38. The device of claim 30, wherein said first tappet section includes a portion for preventing further extension of said extendible tappet section.

39. The device of claim 38, wherein said first tappet section and said extendible tappet section are threadably engaged and said portion on said first tappet section comprises an unthreaded surface on said first tappet section.

40. The device of claim 30, further comprising a seal between said first tappet section and said extendible tappet section.

* * * * *